United States Patent [19]

Osawa et al.

[11] Patent Number: 4,780,783
[45] Date of Patent: Oct. 25, 1988

[54] LOCKING DEVICE FOR A COVER OF MAGNETIC TAPE CARTRIDGE

[75] Inventors: Atsuo Osawa; Kenji Ogiro; Nobuyuki Kaku, all of Yokohama; Shinichi Goto, Kyoto, all of Japan

[73] Assignees: Hitachi, Ltd., Tokyo; Hitachi Maxell, Ltd., Osaka, both of Japan

[21] Appl. No.: 509,048

[22] Filed: Jun. 29, 1983

[30] Foreign Application Priority Data

Jun. 30, 1982 [JP] Japan ................... 57-111767

[51] Int. Cl.⁴ .......................................... G11B 23/087
[52] U.S. Cl. ..................................... 360/132; 242/198
[58] Field of Search ................................. 360/132, 85; 242/197-200

[56] References Cited

U.S. PATENT DOCUMENTS

| | | | |
|---|---|---|---|
| 4,173,319 | 11/1979 | Umeda | 242/199 |
| 4,484,248 | 11/1984 | Ogiro et al. | 360/132 |
| 4,485,988 | 12/1984 | Kikuya et al. | 242/198 |
| 4,485,989 | 12/1984 | Ogiro et al. | 242/198 |
| 4,504,028 | 3/1985 | Goto | 242/198 |
| 4,591,936 | 5/1986 | Kikuya et al. | 360/132 |

Primary Examiner—Stuart N. Hecker
Assistant Examiner—Benjamin E. Urcia
Attorney, Agent, or Firm—Antonelli, Terry & Wands

[57] ABSTRACT

A locking device for a cover of a magnetic tape cartridge for locking a pivotable cover for covering magnetic tape inlet and outlet ports of the magnetic tape cartridge, including a projection formed on an arm for pivotally supporting the pivotable cover which is engageable with an engaging claw section of a locking member which further includes an operation section and a resilient section. The locking member is pivotally supported on a magnetic tape cartridge case and urged by the biasing force of the resilient section to bring the engaging claw section into engagement with the projection. The operation section of the locking member is located in a position in which it is capable of cooperating with an unlocking pin moved from three directions, to thereby give latitude to the process for loading a magnetic tape cartridge on a magnetic recording and reproducing apparatus.

3 Claims, 7 Drawing Sheets

LOCKING DEVICE FOR A COVER OF MAGNETIC TAPE CARTRIDGE

BACKGROUND OF THE INVENTION

This invention relates to magnetic tape cartridges suitable for use with magnetic recording and reproducing apparatus, and more particularly, to a locking device for a cover of a magnetic tape cartridge for locking the cover of the magnetic tape cartridge when it is in a closed position to prevent it from inadvertently opening.

To facilitate handling of magnetic tapes, magnetic image recording and reproducing apparatus for recording and reproducing image output signals and television signals of video cameras use magnetic tape cartridges each of which have a magenetic tape contained in a cartridge case to enable recording and playback of the signals to be performed continuously by successively replacing the magnetic tape cartridge by a new one. The magnetic tape cartridge containing a magnetic tape comprises a supply reel and a takeup reel, the supply reel having the magnetic tape wound the thereon. When the magnetic tape cartridge is loaded on a magnetic recording and reproducing apparatus and the apparatus is brought to a recording mode or a playback mode, the supply reel and the takeup reel are driven so that the magnetic tape is payed out of the supply reel and wound on the takeup reel.

As disclosed in U.S. Pat. No. 4,173,319, for example, a magnetic tape cartridge is formed at a front surface of a cartridge case with open areas for withdrawing the magnetic tape from the cartridge case when recording or playback is performed. Thus, a portion of the magnetic tape is exposed on the front surface side of the cartridge case at all times, and dust might adhere to the exposed portion of the tape or the hand of an operator might be brought into direct contact therewith. To avoid this trouble, a pivotable cover is pivotably connected to the front surface of the cartridge case.

When the magnetic tape cartridge is not in use, the pivotable cover is in a closed position to cover the portion of the magnetic tape which is exposed on the front surface side of the cartridge case when the tape cartridge is used for recording or playback. The pivotable cover is kept in the closed position by locking means. When the magnetic tape cartridge is loaded on a recording and reproducing apparatus, unlocking means provided to the recording and reproducing apparatus releases the locking means for the pivotable cover to allow the cover to move in pivotal movement from the closed position to an open position, so that the magnetic tape can be withdrawn from the cartridge case for a predetermined length and wound on a recording and reproducing head to perform recording or playback.

The locking means of the cartridge case comprises a locking claw located on one side of the cartridge case near the pivotable cover and brought at its forward end into engagement with a recess formed on an inner surface of the cover when the cover is in the closed position, to thereby prevent the cover from being brought to an open position. A pin integrally formed with the claw and projecting from the side of the cartridge case is located near the claw and, when the cartridge case is loaded on a magnetic recording and reproducing apparatus, an unlocking pin presses against the pin of the cartridge case to force same into the cartridge case and moves the claw integral with the pin rearwardly into the cartridge case, to thereby release the claw from engagement with the cover and allow the cover to move to the open position. The claw and the pin of the cartridge case are biased in one direction by a spring, so that they are normally urged by the biasing force of the spring to protrude away from the side of the cartridge case.

In the magnetic tape cartridge of the prior art, the claw and the pin extend outwardly from the cartridge case at one side and it is necessary, when it is desired to unlock the cover, to press the pin into the cartridge case at the side thereof. This would place limitations on the process for loading the magnetic tape cartridge on a magnetic recording and reproducing apparatus. More specifically, when it is desired to unlock the cover, it is necessary to move the claw which is in engagement with the recess of the cover back into the cartridge case. To this end, the unlocking pin should press against the pin extending from the cartridge case at one side thereof, and it is necessary either to move the unlocking pin or attach the cartridge case to the recording and reproducing apparatus in such a manner that the pin of the cartridge case is pressed by the unlocking pin.

The magnetic recording and reproducing apparatus is provided with a number of pins including a reference pin for placing the magnetic tape cartridge in a correct position, a sensing pin for sensing erasure prevention, a brake releasing pin for releasing the takeup and supply reels from the braked condition, etc. These pins are preferably fixed and remain stationary to minimize misoperations. Likewise, the unlocking pin for unlocking the cover allowing same to move to the open position, is preferably fixed and remains stationary. A magnetic recording and reproducing apparatus preferably allows a magnetic tape cartridge to be loaded thereon from any direction as desired. Stated differently, it is preferable that the magnetic tape cartridge be automatically placed in a correct position in the magnetic recording and reproducing apparatus and the cover of the cartridge case be unlocked when the magnetic tape cartridge is loaded on the magnetic recording and reproducing apparatus irrespective of the fact that the cartridge case may be inserted in the apparatus through its top side, through its front side or through its lateral side.

This invention has as its object the provision of a locking device or a cover of a magnetic tape cartridge which enables the cover to be unlocked automatically when the magnetic tape cartridge is loaded on a magnetic recording and reproducing apparatus no matter from which direction the magnetic tape cartridge may be inserted in the magnetic recording and reproducing apparatus.

The locking device for a cover of a magnetic tape cartridge according to the invention comprises a projection formed on one of a plurality of arms for supporting a pivotable cover and engageable with an engaging claw section of a locking member pivotally connected to a magnetic tape cartridge case. The locking member further comprises a resilient section for urging by its biasing force the engaging claw section into engagement with the projection of the arm, and an operation section located in a position in which it is capable of cooperating with an unlocking pin which may move from one of three different directions whereby latitude can be imparted to the loading of the magnetic tape cartridge on a magnetic recording and reproducing apparatus.

DETAILED DESCRIPTION

A preferred embodiment of the locking device for a cover of a magnetic tape cartridge according to the invention will now be described by referring to the accompanying drawings.

Figure 1:
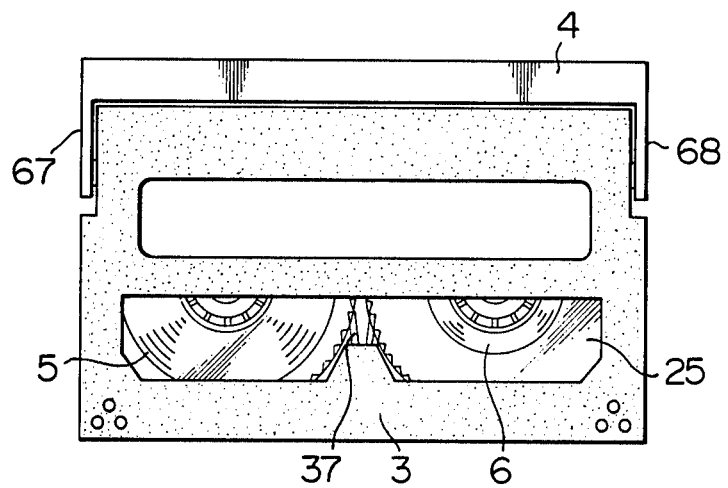
FIG. 1 is a plan view of a magnetic tape cartridge in which the present invention can be incorporated.
Figure 2:
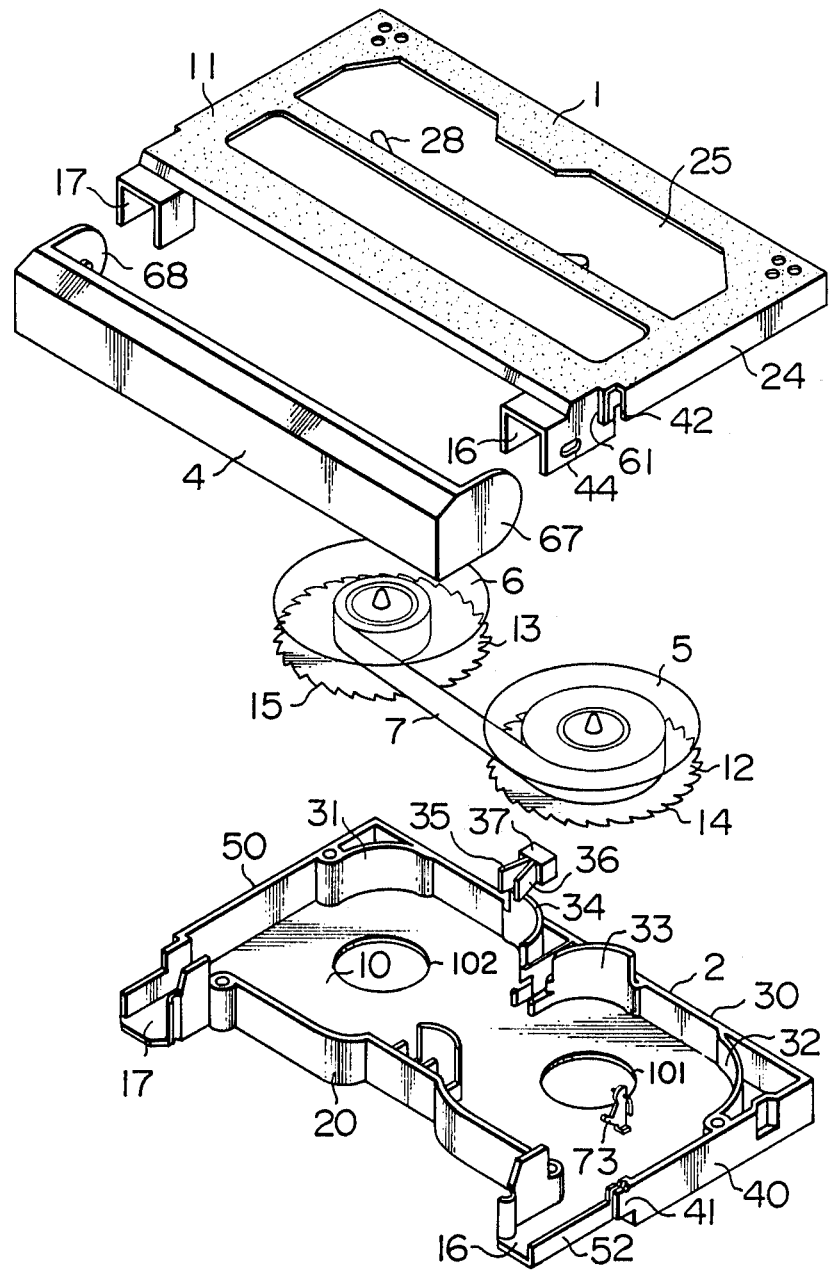
FIG. 2 is an exploded perspective view of the magnetic tape cartridge shown in FIG. 1.

Referring to FIGS. 1 and 2, a magnetic tape cartridge comprises a cartridge case 3 including an upper case member 1 and a lower case member 2, and a pivotable cover 4 attached to a front surface of the cartridge case 3 for pivotal movement. The upper and lower case member 1, 2 and the pivotable cover 4 are formed of a synthetic resinous material. The cartridge case 3 contains therein a supply reel 5 and a takeup reel 6, and a magnetic tape 7 wound on the supply reel 5 is wound at one end portion thereof on the takeup reel 6. The supply reel 5 and takeup reel 6 are rotatably supported in the cartridge case 3 in such a manner that their center axes are inserted in apertures 101, 102 respectively formed in the lower case member 2.

The lower case member 2 has a front wall 20, a rear wall 30, a left side wall 40 and a right side wall 50 extending vertically upwardly from a bottom wall 10. An arcuate first inner wall 31 is provided to a corner formed by the right side wall 50 and the rear wall 30, and an arcuate second inner wall 32 similar to the arcuate first inner wall 31 is provided to a corner formed by the left side wall 40 and the rear wall 30. Arcuate third and fourth inner walls 33, 34 are provided to the vicinity of a central portion of the rear wall 30. The third, fourth inner walls 33 and 34 each have a greater height than the rear wall 30, so that when the upper, lower case members 1 and 2 are assembled to provide the cartridge case 3, upper end portions of the third and fourth inner walls 33, 34 enter the upper case member 1 and come into contact with a top wall 11 of the upper case member 1. A rotation preventing member 37 is mounted between the third, fourth inner walls 33 and 34, with the rotation preventing member 37 having two resilient pieces 35, 36 brought into engagement at their forward ends with serrations 15, 14 formed on outer circumferential surfaces of lower flanges 13, 12 of the takeup reels 6 and supply reels 5, respectively, to thereby prevent the supply reel 5 and takeup reel 6 from rotating to avoid loosening of the magnetic tape 7 when the magnetic tape cartridge is not loaded on a magnetic recording and reproducing apparatus.

The lower case member 2 is formed at its front with a central portion and a side portion on either side of the central portion. The side portions protrude forwardly of the central portion to form lower portions of a first port 16 and a second port 17 for the magnetic tape 7 to move out of and into the cartridge case 3. The magnetic tape 7 is payed out of the supply reel 5, withdrawn from the cartridge case 3 through the first port 16 and led into the cartridge case 3 through the second port 17 to be wound on the takeup reel 6.

Figure 3:
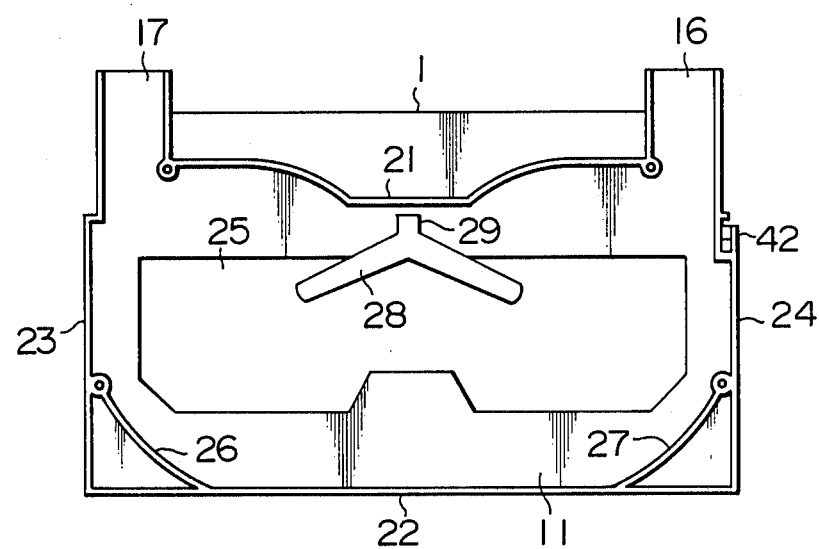
FIG. 3 is a bottom plan view of the upper case member of the magnetic tape cartridge in which the invention can be incorporated.

As shown in FIG. 3, like the lower case member 2, the upper case member 1 is provided with a front wall 21, a rear wall 22, a right side wall 23 and a left side wall 24, and the top wall 11 of the upper case member 1 is formed with a window 25 in a central portion which has bounded thereto a transparent sheet of synthetic resinous material. An arcuate fifth inner wall 26 is provided to a corner formed by the right side wall 23 and the rear wall 22, and an arcuate sixth inner wall 27 is provided to a corner formed by the left side wall 24 and the rear wall 22. The upper case member 1 is formed at its front with upper members of the first port 16 and second port 17 located on opposite sides and protruding forwardly of a central portion interposed therebetween. The upper portions of the first port 16 and second port 17 cooperate with the lower portions of the first port 16 and second port 17 to define the first port 16 and the second port 17 for the magnetic tape 7 to move therethrough into and out of the cartridge case 3. Located in the vicinity of the central portion of the front wall 21 is a reel keep member 28 formed of a resilient metal sheet which is bonded at a forward end portion 29 to the top wall 11.

When the upper case member 1 and lower case member 2 are connected to each other, the front wall 21, rear wall 22, right side wall 23 and left side wall 24 of the upper case member 1 are connected to the front wall 20, rear wall 30, right side wall 50 and left side wall 40, respectively, of the lower case member 2. While the two case members 1, 2 are in this condition, they are screwed together. The left side wall 24 of the upper case member 1 is bent in a portion thereof nearer to the front surface to form a protrusion 42 extending forwardly. The left side wall 40 of the lower case member 2 is also formed with a protrusion 41 similar to the protrusion 42 in shape located in a position corresponding to that of the protrusion 42.

Figure 4:
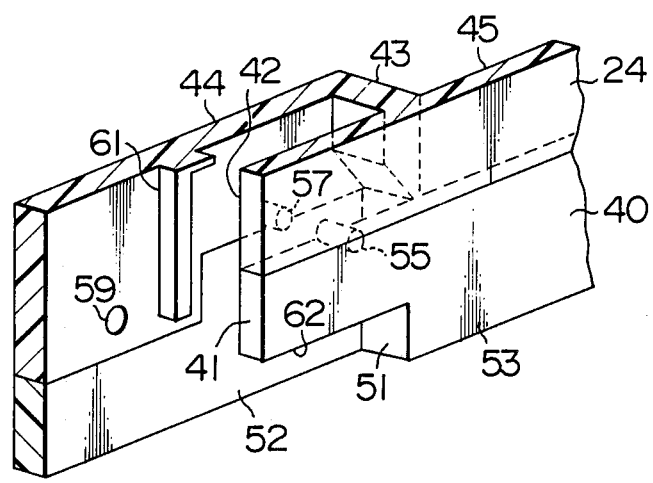
FIGS. 4 and 5 are sectional views, on an enlarged scale, of the left side walls of the upper and lower case members of the magnetic tape cartridge in which the invention is incorporated.
Figure 5:
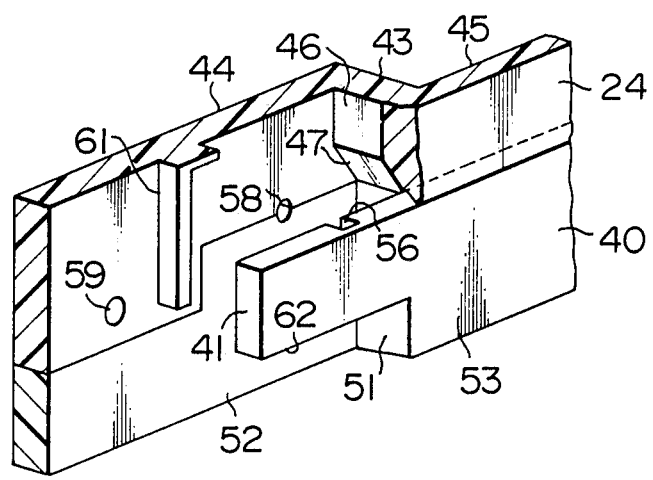
Figure 6:
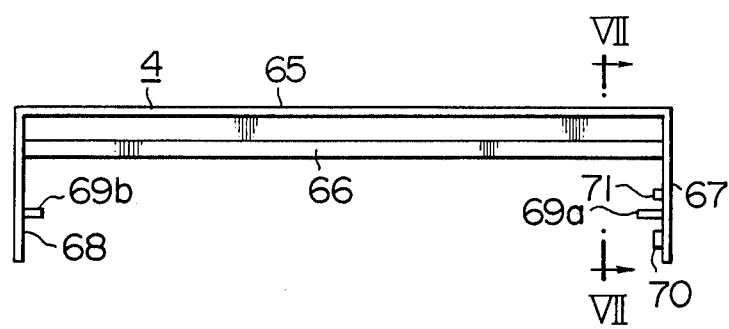
FIG. 6 is a bottom plan view of the pivotable cover in which the invention is incorporated.
Figure 7:
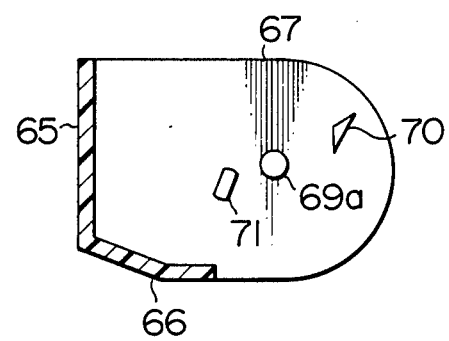
FIG. 7 is a sectional view, on an enlarged scale, taken along the line VII—VII in FIG. 6.

As shown in FIGS. 4 and 5, the portions of the left side walls 24 and 40 of the upper, lower case members 1 and 2 are connected together, and protrusions 42, 41 are respectively formed on the side walls 24, 40. The left side wall 24 of the upper case member 1 includes a bent portion 43 which, bent in the form of a crank, is located at right angles to the forward and rearward end portions 44, 45, and the protrusion 42 extends forwardly from the rearward end portion 45 at a right angle to the bent portion 43. The bent portion 43 has a vertical wall portion 46 and an inclined wall portion 47. The left side wall 40 of the lower case member 2 is also formed with a bent portion 51 of a crank shape which is at right angles to a forward end portion 52 and a rearward end portion 53, and the protrusion 41 extends forwardly from the rearward end portion 53 at a right angle to the bent portion 51. In FIG. 5, the protrusion 42 of the upper case member 1, shown in FIG. 4, is cut off and removed from the left side walls 24, 40. The forward end portion 44 and the protrusion 42 of the upper case member 1 extend forwardly in parallel to each other, and the forward end portion 52 and the protrusion 41 of the lower case member 2 extend forwardly in parallel to each other. A locking member, described hereinbelow, is located in a space defined between the forward end portions 42, 41 and the protrusions 42, 41. Cutouts 56, defining an opening 55 for a rotary shaft of the locking member to extend therethrough, are formed at surfaces of the two protrusions 42, 41 which are in contact with each other. Likewise, cutouts 58 defining an opening 57 are formed at surfaces of the forward end portion 44 of the upper case member 1 and the forward end portion 52 of the lower case member 2 which are in contact with each other. An opening 59 for receiving a rotary shaft of the pivotable cover 4 is formed in the forward end portion 44 of the upper case member 1 which has a rib 61 attached thereto. The protrusion 41 of the lower case member 2 is formed with a stepped portion 62 at its lower end. As shown in FIGS. 6 and 7, the pivotable cover 4 includes a front plate 65 and an upper plate 66, with the front plate 65 covering the first and second tape ports 16, 17 of the cartridge. The case 3 is formed integrally with a left side arm 67 and a right side arm 68 located on left and right sides respectively, with the left side arm 67 having attached thereto a rotary shaft 69a, and the right side arm 68 having attached thereto a rotary shaft 69b. The rotary shaft 69a of the left side arm 67 is inserted in the opening 59 formed in the forward end portion 44 of the left side wall 24 of the upper case member 1, and the rotary shaft 69b of the right side arm 68 is formed in an opening, not shown, formed in the right side wall 23 of the upper case member 1, to enable the pivotable cover 4 to pivot about the rotary shafts 69a, 69b. The left side arm 67 is formed with a triangular projection 70 and a rib 71 in the vicinity of the rotary shaft 69a.

Figure 8:
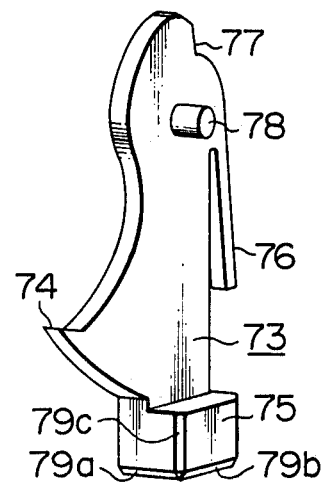
FIG. 8 is a perspective view, on an enlarged scale, of the locking member according to the invention.

In FIG. 8 shows in a perspective view, the locking member 73, formed of resilient synthetic recinous material, includes a locking claw section 74 curved and pointed at its forward end, a release operation section 75, a resilient section 76, a stopper section 77 and a rotary shaft 78. The release operation section 75 is a parallelopiped in shape which has two sides of its bottom surface and two vertical sides cut at their corners to provide inclined surfaces 79a, 79b, 79c and 79d. The locking member 73 is inserted in a space defined between the forward end portion 44 and protrusion 42 of the upper case member 1 and a space defined between the forward end portion 52 and protrusion 41 of the lower case member 2 shown in FIG. 4. The rotary shaft 78 of the locking member 73 is inserted in the opening 55, and an extension, not shown, of the rotary shaft 58 on a side of the locking member 73 opposite the side thereof shown in FIG. 8 is inserted in the opening 57, so that the locking member 73 moves in pivotal movement about the rotary shaft 78. The release operation section 75 is inserted, when the locking member 73 is attached to the cartridge case 3, in a space formed below the stepped portion 62 of the protrusion 41 of the lower case member 2, and the resilient section 76 is brought into contact with the wall of the bent portion 51 of the lower case member 1 at this time. The stopper section 77 is brought into contact with the vertical wall portion 46 of the upper case member 1.

Figure 9:
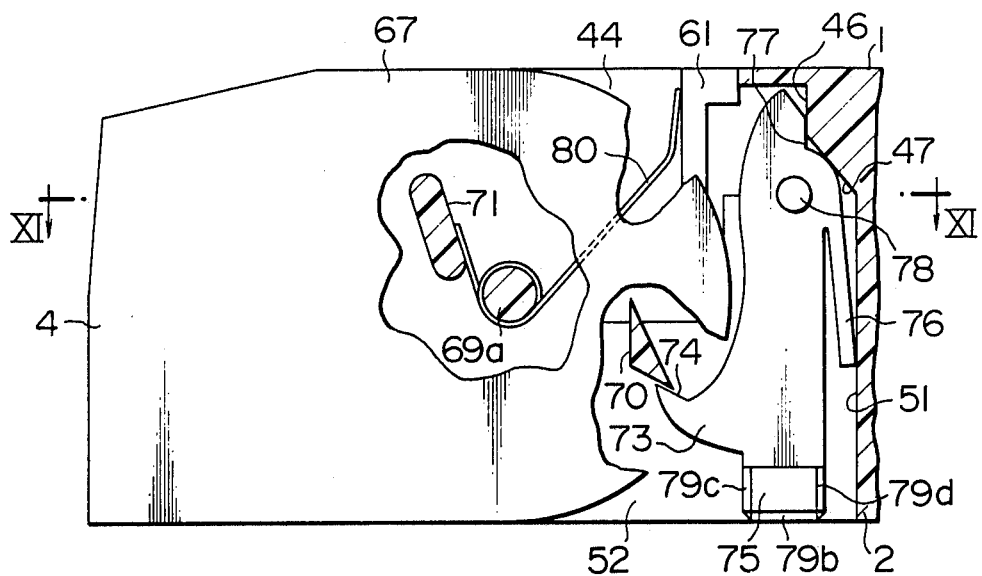
FIG. 9 is a side view of the locking device for a cover of a magnetic tape cartridge according to the invention.
Figure 10:
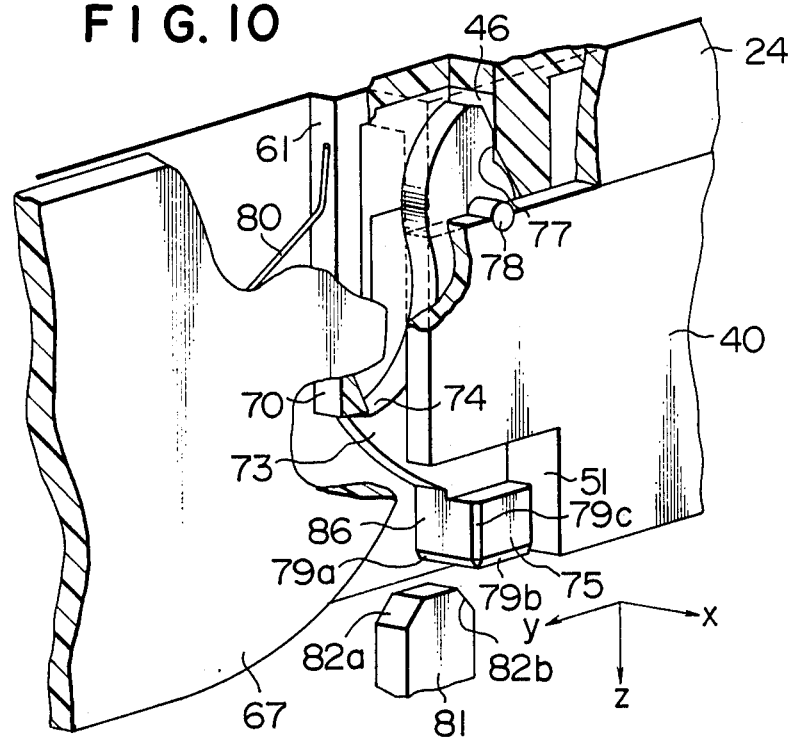
FIG. 10 is a perspective view of the locking device for a cover of a magnetic tape cartridge according to the invention.
Figure 11:
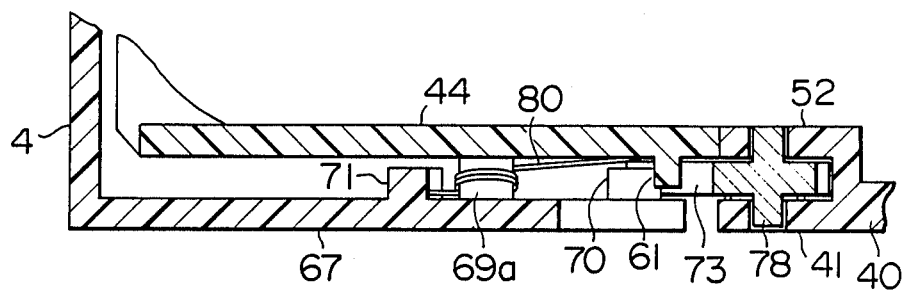
FIG. 11 is a sectional view taken along the line XI—XI in FIG. 9.

FIGS. 9, 10 and 11 show the manner in which the pivotable cover 4 and the locking member 73 are attached to the cartridge case 3. As shown, the locking member 73 is urged at all times by the biasing force of the reslient section 76, which is in contact with the bent portion 51 of the lower case member 2, to move in pivotal movement in a clockwise direction about the rotary shaft 78. By virtue of this force, the stopper section 77 is kept in abutting engagement with the vertical surface portion 46 of the upper case member 1, to thereby prevent the locking member 73 from further moving in pivotal movement. In FIGS. 9 and 10, the rotary shaft 69a, projection 70 and rib 61 which are attached to the left side arm 67 of the pivotable cover 4 are exposed to view by cutting out a portion of the left side arm 67. A coil spring 80 which engages at one end thereof the rib 61 of the upper case member 1 and at the other end thereof the rib 71 of the left side arm 67 is mounted around the rotary shaft 69a of the left side arm 67. Thus, the pivotable cover 4 is urged at all times by the biasing force of the coil spring 80 to move in pivotal movement in a counterclockwise direction about the rotary shaft 69a, and covers the tape inlet and outlet ports of the cartridge case 3. When the pivotable cover 4 is in the closed position, the projection 70 of the left side arm 67 is in engagement with the locking claw section 74 of the locking member 73 to prevent the pivotal cover 4 from moving to the open position. The projection 70 is located in a position in which a straight line connecting the point of contact of the projection 70 with the locking claw section 74 with the center of the rotary shaft 69a and a straight line connecting the point of contact of the projection 70 with the locking claw section 74 with the center of the rotary shaft 78 of the locking member 73 form an angle of 90 degrees at their intersection. Stated differently, the projection 70 is formed in a position in which a straight line connecting the rotary shaft 69a with the projection 70 and a straight line connecting the projection 70 with the rotary shaft 78 form an angle of 90 degrees. By this arrangement, even if an attempt is made to open the pivotal cover 4 by moving the cover 4 in pivotal movement in a clockwise direction about the rotary shaft 69a, the force exerted by the projection 70 on the locking member 73 would be oriented in a direction along the straight line connecting the point of contact of the projection 70 with the locking claw section 74 with the rotary shaft 78 and no component force tending to move the locking member 73 in pivotal movement would be produced. Thus, the projection 70 could not be brought out of engagement with the locking claw section 74, thereby preventing the pivotal cover 4 from moving to the open position.

Figure 12:
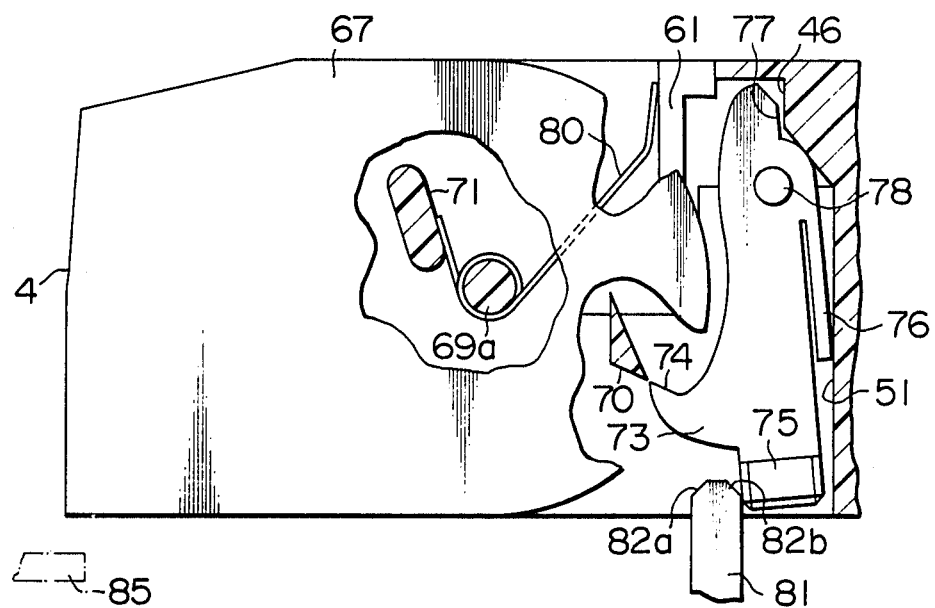
FIG. 12 is a perspective view in explanation of the operation of the locking device, in an unlocked position, for a cover of a magnetic tape cartridge according to the invention.

Operation of loading the magnetic tape cartridge provided with the locking device for a cover of a magnetic tape cartridge of the aforesaid construction according to the invention on a magnetic recording and reproducing apparatus will now be described. As the magnetic tape cartridge is loaded on the apparatus, the unlocking pin of the magnetic recording and reproducing apparatus is positioned to have its forward end portion located near the release operation section 75 of the locking lever 73, as shown in FIG. 10. The unlocking pin 81 is attached to an auxiliary chassis of the magnetic recording and reproducing apparatus for holding the magnetic tape cartridge thereon and located in a position in which the unlocking pin 81 is brought, when the magnetic tape cartridge is correctly placed in a predetermined position on the auxiliary chassis of the magnetic recording and reproducing apparatus, into contact with the release operation section 75 of the locking pin 73. The unlocking pin 81 shown in FIG. 10 is in the form of a plate and opposite corners of a top side formed by cooperation with vertical opposite sides are cut obliquely to provide inclined surfaces 82a and 82b. When the magnetic tape cartridge is forced against the unlocking pin 81, the latter is brought into contact with the release operation section 75 of the locking member 73 and moves the locking member 73 in pivotal movement in a counterclockwise direction, to thereby release the locking claw section 74 of the locking member 73 from engagement with the projection 70 and unlock the pivotable cover 4. If the magnetic tape cartridge is pressed downwardly as shown in FIG. 12, the inclined surface 79a of the release operation section 75 impinges on the inclined surface 82b of the unlocking pin 81 to further press the magnetic tape cartridge downwardly. This allows the release operation section 75 to slide along the inclined surface 82b of the unlocking pin 81 and causes the locking member 73 to move in pivotal movement about the rotary shaft 78 in a counterclockwise direction, with the result that the resilient section 76 is compressed. When the forward end of the compressed resilient section 76 reaches the main body of the locking member 73, the locking claw section 74 is released from engagement with the projection 70, thereby unlocking the pivotable cover 4. This allows the auxiliary chassis holding the magnetic tape cartridge thereon to move downwardly together with the magnetic tape cartridge, to move the magnetic tape cartridge on to a reel bed of the magnetic recording and reproducing apparatus. While the auxiliary chassis is moving downwardly, a lower end of the pivotable cover 4 strikes a projection 85 (see FIG. 12) attached to the magnetic recording and reproducing apparatus, and the pivotable cover 4 moves in pivotal movement in a clockwise direction against the biasing force of the coil spring 80 to an open position.

The direction in which a magnetic tape cartridge is moved when it is loaded on a magnetic recording and reproducing apparatus may vary depending on the type of the magnetic recording and reproducing apparatus. In FIG. 10, the directions in which the magnetic tape cartridge may be moved when loaded on a magnetic recording and reproducing apparatus are indicated by arrows x, y and z. In one type of magnetic recording and reproducing apparatus, the magnetic tape cartridge is moved vertically downwardly or in the direction of an arrow z when it is placed on the auxiliary chassis. In this type, the inclined surface 79a of the release operation section 75 impinges on the inclined surface 82b of the unlocking pin 81 and causes the locking member 73 to move in pivotal movement in a counterclockwise direction about the rotary shaft 78 as the magnetic tape cartridge is moved downwardly, to thereby unlock the pivotable cover 4. With the unlocking pin 81 and the release operation section 75 having the inclined surfaces 82b 79a respectively formed therein, it is possible to unlock the cover 4 even if the magnetic tape cartridge is not correctly positioned on the auxiliary chassis when the former is placed on the latter.

In another type of magnetic recording and reproducing apparatus, the magnetic tape cartridge is moved horizontally or in the direction of an arrow y when it is placed on the auxiliary chassis. The left side wall 24 of the upper case member 1 of the cartridge case 3 and the left side wall 40 of the lower case member 2 thereof are bent at the bent portions 43, 51 respectively, and a space is defined between the forward end portions 44, 52 of the left side walls 24, 40 respectively and the left side arm 67 of the pivotable cover 4 as shown in FIG. 11. Thus, when the magnetic tape cartridge is moved forwardly in a horizontal direction, the unlocking pin 81 moves between the forward end portions 44, 52 and the left side arm 67 from the front side of the magnetic tape cartridge toward the rear side thereof relative thereto into abutting engagement with an operation surface 86 (see FIG. 10) of the release operation section 75, to thereby move the locking member 73 in pivotal movement in a counterclockwise direction and unlock the cover 4.

In still another type of magnetic recording and reproducing apparatus, the magnetic tape cartridge is moved transversely in a horizontal direction or in the direction of an arrow x when it is placed on the auxiliary chassis. In this case, the unlocking pin 81 is located in a position displaced rightwardly from the position in which it is shown in FIG. 10. As the tape cartridge is moved in the direction of the arrow x, the inclined surface 79a of the release operation section 75 impinges on the unlocking pin 81, so that the locking member 73 moves in pivotal movement in a counterclockwise direction about the rotary shaft 78 and unlocks the cover 4.

From the foregoing description, it will be appreciated that the locking device for a cover of a magnetic tape cartridge according to the invention enables unlocking of the pivotable cover to be satisfactorily achieved irrespective of the direction in which the magnetic tape cartridge is moved when it is loaded on a magnetic recording and reproducing apparatus, thereby establishing compatibility of magnetic recording and reproducing apparatus with magnetic tape cartridges and giving latitude to magnetic tape cartridges with respect to the process in which they are moved when loaded on magnetic recording and reproducing apparatus.

What is claimed is:

1. A tape cartridge comprising:
a cartridge case having a front wall, side walls and top and bottom walls for defining a chamber therein for accommodating a magnetic tape wound around tape supply and takeup reels, and being provided with tape inlet and outlet ports in said front wall for withdrawing said tape from said cartridge to an outside and for allowing said tape to enter from the outside into said case;
A pivotable cover having a front plate, left and right arms projecting from said front plate, and an engageable projection provided on one of said left and right arms, one of said left and right arms being opposed to one of the side walls of said case with a clearance therebetween and being pivotably movably connected to said case for covering and exposing said tape inlet and outlet ports,
locking means in said clearance for maintaining said cover in a covering position in which said cover operably covers said tape inlet and outlet ports, said locking means having an engaging claw section for operably engaging with said projection, resilient means for urging said claw section to move to an engageable position in which said claw section is brought into engagement with said projection when said cover is brought into a closed position capable of covering said tape inlet and outlet ports, and a release operation section operated by an unlocking pin of a recording device which enters into said clearance from outside of said case for releasing said claw section from the engagement with said projection;

wherein the side wall of said magnetic cartridge case and a rear end of the side arm of said pivotal cover includes means for defining a space so as to enable the release operation section to be accessed by said unlocking pin not only in a direction perpendicular to the front wall within said clearance but also in a direction perpendicular to the side wall and perpendicular to the bottom wall of said case; and means provided on the locking means for enabling the unlocking pin to pivot the locking means by contacting said release operation section from, selectively, the direction perpendicular to the front wall, the direction perpendicular to the side wall, and the direction perpendicular to the bottom wall of said case.

2. A locking device for a pivotable cover of a magnetic tape cartridge as claimed in claim 1, wherein said release operation section of said locking means has a locking member.

3. A locking device for a pivotable cover of a magnetic tape cartridge as claimed in claim 1, wherein a surface of said release operation section contacted by the unlocking pin is a beveled surface.

* * * * *